United States Patent
Hussmann et al.

(10) Patent No.: US 12,236,678 B2
(45) Date of Patent: Feb. 25, 2025

(54) MOBILE ANALYSIS AND PROCESSING DEVICE, AND METHOD, FOR AGRICULTURE FOR TILLING THE SOIL AND/OR FOR MANIPULATING FLORA AND FAUNA

(71) Applicant: NAITURE GMBH & CO. KG, Friedrichsgabekoog (DE)

(72) Inventors: Stephan Hussmann, Heide (DE); Florian Johannes Knoll, Husum (DE); Vitali Czymmek, Heide (DE)

(73) Assignee: Westhof Patente GmbH, Friedrichsgabekoog (DE)

( * ) Notice: Subject to any disclaimer, the term of this patent is extended or adjusted under 35 U.S.C. 154(b) by 1005 days.

(21) Appl. No.: 17/268,365

(22) PCT Filed: Aug. 22, 2019

(86) PCT No.: PCT/EP2019/072522
§ 371 (c)(1),
(2) Date: Feb. 12, 2021

(87) PCT Pub. No.: WO2020/039046
PCT Pub. Date: Feb. 27, 2020

(65) Prior Publication Data
US 2021/0176978 A1 Jun. 17, 2021

(30) Foreign Application Priority Data
Aug. 24, 2018 (DE) .......... 10 2018 120 753

(51) Int. Cl.
*G06V 20/10* (2022.01)
*A01B 39/08* (2006.01)
(Continued)

(52) U.S. Cl.
CPC .......... *G06V 20/188* (2022.01); *A01B 39/085* (2013.01); *A01B 79/005* (2013.01);
(Continued)

(58) Field of Classification Search
None
See application file for complete search history.

(56) References Cited

U.S. PATENT DOCUMENTS 10,438,343 B2 * 10/2019 Baurer ............... A01G 7/00
10,548,306 B2    2/2020 Albert et al.
(Continued)

FOREIGN PATENT DOCUMENTS

DE           4039797 A1    9/1991
DE     102013222776 A1    5/2015
(Continued)

OTHER PUBLICATIONS

Chinese National Intellectual Property Administration, First Office Action, Aug. 2, 2022, pp. 1-6, Application No./Patent No. 201980055942.0, Applicant: Naiture GMBH &Co. KG.
(Continued)

*Primary Examiner* — Scott A Rogers
(74) *Attorney, Agent, or Firm* — WOODLING, KROST AND RUST (57) ABSTRACT

The invention relates to a mobile analysis and processing device (14) for agriculture for processing the soil and/or manipulating flora and fauna. The device (14) comprises at least one sensor (62), a tool unit (52) having at least one motor-driven tool (58), an actuator (48) for moving at least the tool (58) of the tool unit (52), a motor (50) for driving the tool (58) and/or the actuator (48), a database (78), a first communication unit (60) having an interface (70*a*), and a first computer (46) for controlling the sensor (62), the tool unit (52) and the actuator (48) by means of generated control
(Continued)

commands. The data captured by means of the sensor (62) are continually compared with the data stored in the database (78) in order to generate corresponding control signals for the actuator (48), the tool unit (52) and/or the motor (50). By means of said device, mobility and flexibility are created, in accordance with which flexibility the device (14) forms a unit by means of which all data can be processed in real time, control signals can be generated for the actuator (48), the tool unit (52) and/or the motor (50) and immediate operation in accordance with the control signals is possible. Thus, combination with, for example, different carriers (12), which move the device (14) over the field if necessary, is possible.

21 Claims, 10 Drawing Sheets (51) Int. Cl.
| | |
|---|---|
| *A01B 79/00* | (2006.01) |
| *B64U 101/40* | (2023.01) |
| *G06N 3/08* | (2023.01) |
| *G06T 7/11* | (2017.01) |
| *B64U 10/14* | (2023.01) |
| *B64U 50/19* | (2023.01) |
| *B64U 101/30* | (2023.01) |

(52) U.S. Cl.
CPC ............... *G06N 3/08* (2013.01); *G06T 7/11* (2017.01); *B64U 10/14* (2023.01); *B64U 50/19* (2023.01); *B64U 2101/30* (2023.01); *B64U 2101/40* (2023.01); *G06T 2207/30188* (2013.01)

(56) References Cited

U.S. PATENT DOCUMENTS

| | | | | |
|---|---|---|---|---|
| 10,796,275 | B1* | 10/2020 | Wilkins | G06Q 10/087 |
| 11,238,283 | B2* | 2/2022 | Young | H04W 4/021 |
| 2014/0168412 | A1* | 6/2014 | Shulman | G06V 20/20 |
| | | | | 348/89 |
| 2017/0031365 | A1* | 2/2017 | Sugumaran | G05D 1/0219 |
| 2017/0039861 | A1* | 2/2017 | Ceribelli | G05D 1/0005 |
| 2017/0094909 | A1* | 4/2017 | Bhavani | A01D 46/30 |
| 2017/0315555 | A1* | 11/2017 | Sugumaran | G05D 1/0246 |
| 2017/0374323 | A1* | 12/2017 | Gornik | H04N 23/685 |
| 2018/0160673 | A1 | 6/2018 | Albert et al. | |
| 2018/0326890 | A1* | 11/2018 | Hall | A01K 11/006 |
| 2019/0104722 | A1 | 4/2019 | Slaughter et al. | |
| 2022/0111960 | A1* | 4/2022 | Tran | A01G 7/00 |
| 2022/0117146 | A1 | 4/2022 | Hussmann | |

FOREIGN PATENT DOCUMENTS

| | | |
|---|---|---|
| DE | 102015209888 A1 | 12/2016 |
| DE | 102017011747 A1 | 6/2019 |
| EP | 2319283 | 11/2010 |
| WO | 2017181127 A1 | 10/2017 |
| WO | WO-2018033925 A1 * 2/2018 ........... A01D 46/253 |

OTHER PUBLICATIONS

Chinese National Intellectual Property Administration, English Translation of the First Office Action, Aug. 2, 2022, pp. 1-5, Application No./Patent No. 201980055942.0, Applicant: Naiture GMBH &Co. KG.
The International Bureau of WIPO, International Preliminary Report On Patentability, Translation, Mar. 2, 2021, pp. 1-7.
German Patent and Trademark Office, German Examination Report, Jul. 26, 2019. pp. 1-3, Application No. 102018120753.0.
European Patent Office, International Search Report, Dec. 17, 2019, pp. 1-5, Application No. PCT/EP2019/072522.
European Patent Office, Written Opinion, pp. 1-6, Application No. PCT/EP2019/072522.
Canadian Patent Application No. 3,109,704, naiture GMBH & Co. KG, Mobile Analysis and Processing Device, Dated May 23, 2024.

* cited by examiner

MOBILE ANALYSIS AND PROCESSING DEVICE, AND METHOD, FOR AGRICULTURE FOR TILLING THE SOIL AND/OR FOR MANIPULATING FLORA AND FAUNA

PCT/EP2019/072522, international application filing date Aug. 22, 2019 and German patent application no. 10 2018 120 753.0, filed Aug. 24, 2018 are incorporated herein by reference hereto in their entireties.

FIELD OF THE INVENTION

The invention relates to a mobile analysis and processing device for use in agriculture for tilling the soil and/or for manipulating flora and fauna and to a method for real-time control of the tilling of the soil and/or of manipulating flora and fauna by this device.

BACKGROUND OF THE INVENTION

Weed control in agriculture is a very labor-intensive task, especially in organic farming which prohibits or restricts the use of chemicals. Depending on the crop cultivated, weed control may be necessary in close proximity to the crop. Weed control measures are usually taken in the early growth stage of the crop because at this stage, both crops on the one hand and weeds on the other hand are still very small and close to each other. In order to avoid damage to the crop, it is expedient to use selective methods.

Organic farming, for example for carrots, for this purpose adopts a labor-intensive, physically stressful manual approach using so-called lay down or prone weeders comprising platforms on which seasonal workers lie on their stomachs and remove the weeds manually.

For special crops with larger plant spacing, such as sugar beets or lettuce, tractor mounted implements are known which are able to recognize individual crops and control appropriate tools in such a way that they will leave the area of the crop untilled. No selectivity is required for this task, meaning that these systems do not check the areas to be tilled, but rather control the tool "blindly" based on the known crop position. In this case, the accuracy requirements are generally defined by the distance to the crop.

A device for weed control is disclosed in DE 40 39 797 A1, in which an actuator for destroying the weeds is permanently in operation, which operation will only be briefly interrupted when a sensor detects a crop. In this case, the carrier is in the form of a trolley.

Disclosed in DE 10 2015 209 879 A1 is a device for damaging weeds which has a processing tool. This processing tool is used to damage the weeds. In addition, a classification unit is provided which either has the position data of the weeds or detects the weeds and determines the position data. A localization unit determines a relative position between the processing tool and the weeds. A manipulator unit in the form of a trolley positions the processing tool accordingly based on the determined relative positions.

A corresponding device with a pressure conveying unit and a liquid dispensing unit is disclosed in DE 10 2015 209 891 A1. In this embodiment, weeds are destroyed by spraying them with pressurized liquid. The carrier in this case is in the form of a trolley.

DE 10 2015 209 888 A1 discloses the pulsed application of liquid to weeds in order to damage them. Here, too, the carrier is in the form of a trolley.

DE 10 2013 222 776 A1 discloses a ram mounted in a trolley, which ram is arranged in a guide device for guiding the ram. In this case, the ram is positioned on the weed and subjected to pressure. The weed is destroyed by the impingement of the ram under pressure.

Agricultural robots and harvesters, which are automated and equipped with telematics technology to support agriculture, are currently breaking new ground. In many cases, engineering principles and findings from space travel, remote sensing and robotics can be used to solve problems in agriculture. However, they have to be specifically adapted to the tasks in agriculture and require new devices and procedures.

For example, the existing automated agricultural robots mentioned above are systematically designed to drive down only one row of plants at a time. They will only tackle the flora, and only serially. Checks are usually made afterwards by inspection, for example by a qualified human being.

A disadvantage of the known devices is also that they are each specially designed trolleys which only drive down one row of crops at a time and are relatively inflexible to use.

SUMMARY OF THE INVENTION

It is the object of the invention to provide a mobile analysis and processing device for agriculture for tilling the soil and/or for manipulating flora and fauna, as well as a method for the device, which method permits real-time controlled, qualified removal of the detected flora and/or fauna as well as a parallel analysis of flora and fauna. Preferably, the device is adapted to be connected to different carriers that are used to move the device to and across the site where it will be used.

The invention is based on the insight that creating a mobile device that is independent of a carrier and includes all the components required for analysis and processing, will considerably increase the flexibility of its use and the resulting possibilities.

The invention therefore relates to a mobile analysis and processing device for agriculture for tilling the soil and/or manipulating flora and fauna. The device comprises at least one sensor, a tool unit with at least one motor-driven tool, an actuator for moving at least the tool of the tool unit, a motor for driving the tool unit and/or the actuator, a database, a first communication unit with an interface and a first computer for controlling the sensor, the tool unit and/or the actuator based on generated control commands. The data acquired by the sensor are continuously compared with the data stored in the database in order to generate corresponding control signals for the sensor, the tool unit and/or the actuator. This device creates a degree of mobility and flexibility that allows the device to form a separate entity that permits real-time processing of all data, generates control signals for the sensor, the tool unit and/or the actuator and thus enables immediate operation based on the control signals generated. This opens up possibilities for its combination, for example with different carriers for moving the device across the field as needed.

Preferably, synchronization of the data determined by the sensor with the database is performed in real time, in particular with a verification and classification of the data determined by the sensor. This increases the responsiveness of the device.

According to one embodiment of the invention, the sensor is a visual detection unit with a camera. The data to be processed is thus image data which can be easily compared with data in a database.

In order to be able to connect the device, if necessary, to a carrier for moving the device, appropriate means are provided for connecting the device to a carrier.

To facilitate the exchange of individual components and thus reduce set-up times, the device is designed in two parts. A first unit thereof contains the sensor, the tool unit, the motor for driving the tool of the tool unit and/or the actuator, the actuator, the first computer and the first communication unit including an interface. The second unit thereof contains the database, a second computer and a second communication unit including an interface. For data exchange, the first and second units can be connected to each other via the interface. In addition, the two-part design also makes it possible for the two units to be arranged spatially separately from one another. This is advantageous, for example, if the weight of the moving parts of the device is to be kept as low as possible. In this case, the second unit could be arranged in a fixed central position, with the first unit being moved around the field.

In this case, it is convenient for the first unit to comprise a first housing and for the second unit to comprise a second housing which will protect the components contained in the units from external influences.

The first and second housings can be detachably connected to each other via a plug-type connection. This permits the two units to be joined together in a modular fashion, and also facilitates replacement in the case of failure of one unit.

According to one embodiment of the invention, the first and second housings have, as means for connection to the carrier as required, receptacles associated with corresponding holding means of the carrier by means of which the device can be gripped and moved by the carrier. Alternatively or additionally, the first and second housings may have, as means for connection to the carrier as required, coupling means associated with corresponding coupling means of the carrier, by means of which the device can be connected to the carrier and moved by it. This enables simple and quick connection of the device to a carrier for transporting the device.

The tool unit preferably has at least one feed unit and a rotation unit which latter cooperates with the motor. This is an easy way of expanding the operating range of the tool without having to actually move the device.

Preferably, at a distal end thereof, the rotation unit is provided with at least the one tool, in particular with a tiller or with a blade unit. Rotation of the blade unit, for example, can be used to selectively destroy small insects or weeds, for example.

In order to further reduce the weight of the device, a voltage connection is provided for an external voltage supply. The voltage connection may be provided on the first unit. In the assembled state of the first and second units, the second unit can use this voltage connection to supply both the first and second units with voltage. Preferably, the voltage source of a carrier is used for the voltage supply.

In order to enable data exchange between a carrier and the device, the device includes an additional communication interface for the carrier.

The additional communication interface can be arranged in the first unit or in the second unit. Preferably, it is provided in the second unit.

The above-mentioned object is also accomplished by a method for real-time control of the tilling of the soil and/or of manipulating flora and fauna by the device of the above mentioned type, which method comprises the following steps:

continuous recording over time of data-defined voxels and/or pixels by the sensor;

transmitting the recorded data to a database;

storing the recorded data in the database;

qualitative data comparison of the recorded data with the data stored in the database, preferably also performing a segmentation, a data reduction and/or a verification of the recorded data by the computer;

evaluating the compared recorded data with existing defined data sets in the database by a classifier connected to the computer;

processing and conversion of the evaluation by the computer into control data and/or control-related data for the motor, the actuator, the tool unit and/or an associated carrier.

Preferably, after the control data and/or control-related data is available, the motor, the actuator, the tool unit and/or an associated carrier are started up for tilling the soil and/or for manipulating flora and fauna.

According to a preferred method of the invention, the evaluation is performed in a computer cooperating with the classifier, in particular in the second computer, and the processing and conversion of the evaluation into control data and/or data is performed in another computer, in particular in the first computer, for which purpose the evaluation is transmitted from the one computer to the other computer. This reduces computing time, since computers are capable of running in parallel. In addition, this eliminates the need for the two computers to be located adjacent to each other. For example, the second computer with the second unit can be arranged remotely from the first unit with the first computer.

Data storage, qualitative data comparison of the recorded data with data stored in the database and/or evaluation by the classifier are preferably supported by artificial intelligence. This makes it possible to create a system that operates almost autonomously.

The device, in particular the first and second units, can be of modular design which allows them to be connected to each other, but also to other units of an overall system.

Real time in this context means the possibility of being able to perform analysis and processing operations in situ in a single operation.

In the context of the invention, a voxel is understood to be a spatial data set that is generated by the sensor or by a visual detection unit in an imaging process, discretely or continuously in time.

Preferably, the actuator comprises a mechanical system, in particular a rotating unit that is located in a holder in the housing of the first unit.

Additional advantages, features and possible applications of the present invention may be gathered from the description which follows in which reference is made to the embodiments illustrated in the drawings.

Throughout the description, the claims and the drawings, those terms and associated reference signs are used as are listed in the List of Reference Signs below.

DESCRIPTION OF THE INVENTION

Figure 1:
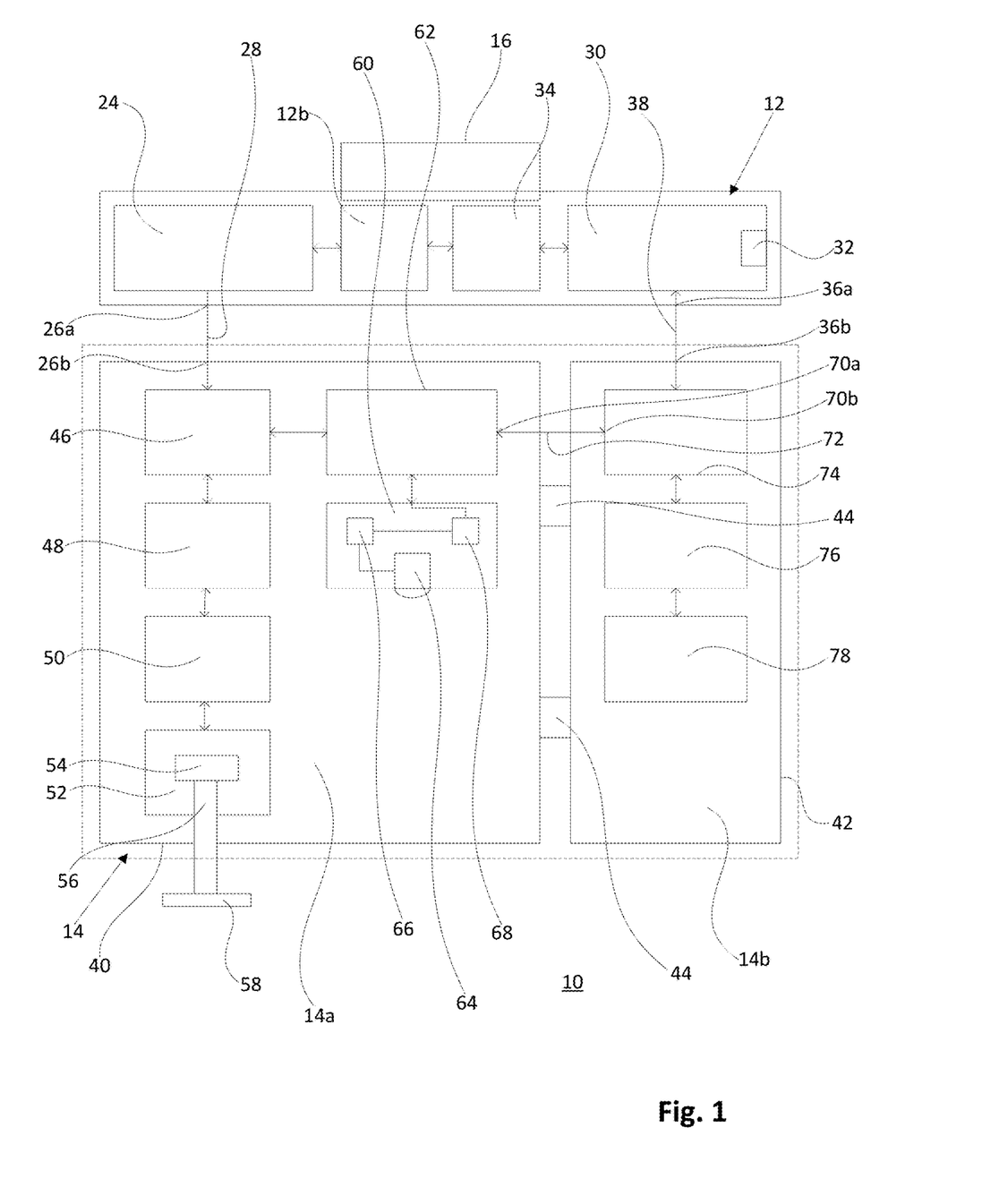
FIG. 1 is a schematic view of a carrier system with spatially separated housings of a mobile device according to a first embodiment of the invention.

FIG. 1 is a schematic view of a carrier system 10 which comprises a carrier in the form of an aerial drone 12 and a mobile device 14 for tilling the ground and for manipulating flora and fauna in agriculture. The aerial drone 12 includes a drive 16 comprising four electric motors 18 and propellers 20 driven by them, see FIG. 3. In addition, the aerial drone 12 has 4 feet 22 disposed below the electric motors 18.

According to the first embodiment of the invention, the aerial drone 12 comprises an energy source in the form of batteries 24, which provides the energy supply for the drive 16 as well as for the further components of the aerial drone 12 and the mobile device 14. For this purpose, a voltage interface 26a is provided on the aerial drone 12 and a voltage interface 26b corresponding to this voltage interface 26a is provided on the mobile device 14, said interfaces being connected to one another via a detachable plug connection 28. In addition, a communication unit 30 with an antenna 32 and a GPS unit 34 is provided which latter continuously determines the location of the aerial drone 12, transmits the location data of the aerial drone 12 to the mobile device 14, for allocation to the data acquired by the mobile device 14, and to a remote central processing unit (not shown here). Telemetry can be performed with the aid of the GPS unit 34, the communication unit 30, and the mobile device 14. In addition, a control unit 12b is provided which controls the drive 16.

In addition to the antenna 32, the communication unit 30 of the aerial drone 12 comprises a further interface 36a which is assigned to an associated interface 36b of the mobile device 14, which interfaces are connected to one another for data exchange by a detachable plug connection 38.

The mobile device 14 comprises two units 14a, 14b, namely a first unit 14a having a first housing 40 and a second unit 14b having a second housing 42. The first housing 40 and the second housing 42 are releasably connected to each other via a plug connection 44 to form a unit constituting the mobile device 14. There is a set of different first units 14a on one side and a set of different second units 14b on the other side, which units can be individually configured and adapted to the respective needs by simply connecting them together.

In the first housing 40, there is a first computer 46, an actuator in the form of a motor-driven movable arm 48, a motor 50 cooperating with the arm 48, a tool unit 52 arranged on the arm 48 and comprising a feed unit 54 and a rotation unit 56. A tiller 58 is provided as a tool on the distal end of the rotation unit 56. The motor 50 drives both the arm 48 and the feed unit 54, the rotation unit 56 and thus also the tiller 58. The arm 48 may be of multi-part design and have various joints, which are not shown here since such motor-driven kinematic units are known. The arm 48 is used to move the tool unit 52 relative to the aerial drone 12 to its area of use, so that the tool unit 52 with the feed unit 54 and the rotation unit 56 can use the tiller 58 to process the plants, for example to remove weeds, and/or to till the soil.

Furthermore, a communication unit 60 and a visual detection unit 62 are arranged in the first unit 14a. The visual detection unit 62 comprises a camera 64 that captures images, a segmentation and data reduction device 66, a classifier 68 that performs classification of a plurality of pixel fields composed of pixels based on an intermediate image or intermediate data generated by the segmentation and data reduction device 66, as will be described in more detail below. The visual detection unit 62 is connected to the communication unit 60.

The first unit 14a has an interface 70a which is associated with an interface 70b of the second unit 14b. Communication link 72 is used to connect the communication unit 60 via interface 70a to interface 70b, and via this to a communication unit 74 in the second unit 14b. Via interface 36b, the communication unit 74 of the second unit 14b is connected via the plug-type connection 38 to interface 36a and to the communication unit 30 of the aerial drone 12.

A second computer 76 and a database 78 are furthermore provided in the second unit 14b.

Figure 2:
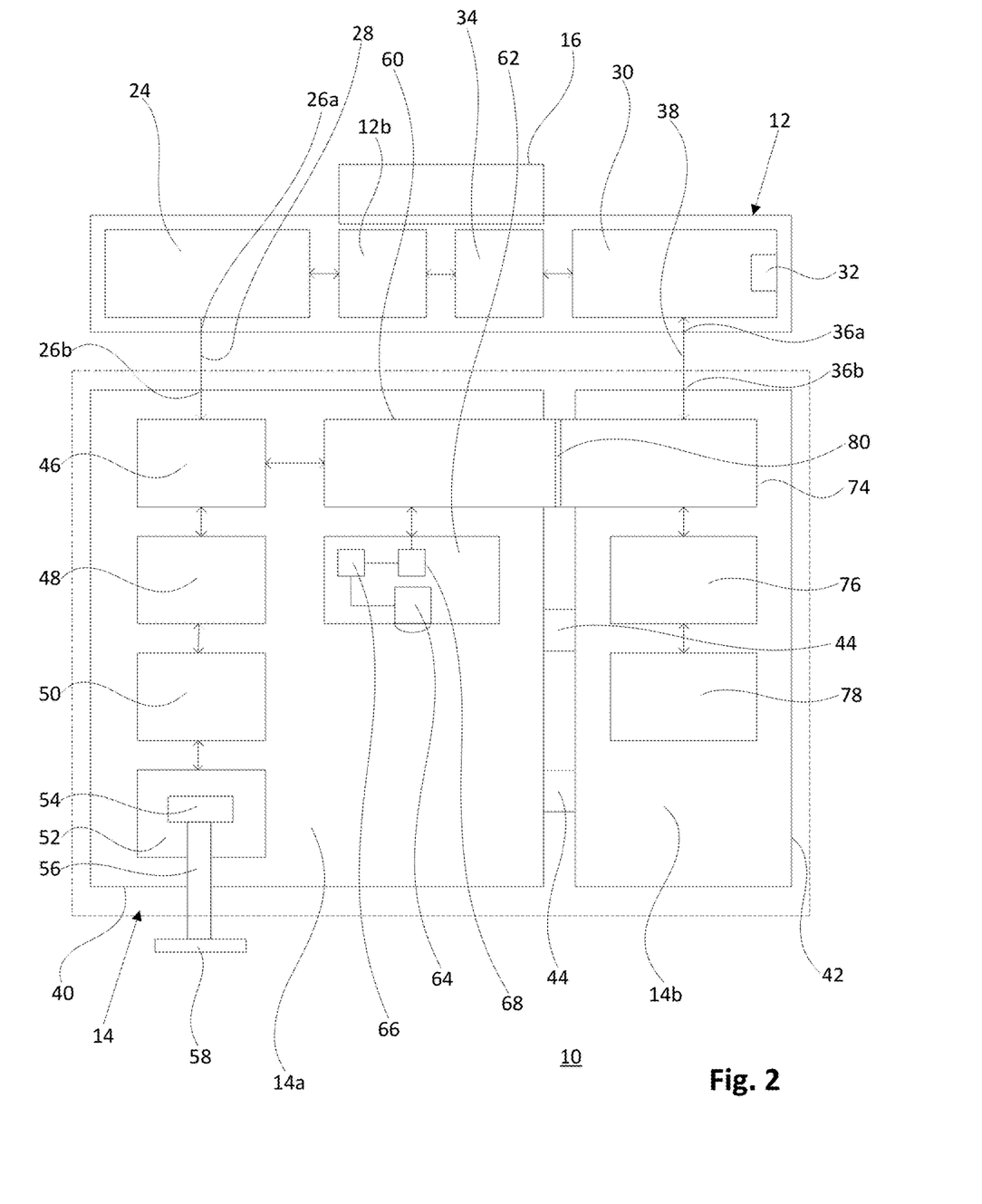
FIG. 2 is a schematic view of a carrier system with spatially separated housings of a mobile device, which housings are connected to each other via a plug-type connection, according to a second embodiment of the invention.

Illustrated in FIG. 2 is a further embodiment of the carrier system 10, with the design of the aerial drone 12 being identical to that of the first embodiment. Only the mobile device 14 differs by a plug-type connection 80 between the first unit 14a and the second unit 14b, which furthermore also detachably connects the communication unit 60 of the first unit 14a to the communication unit 74. By simply plugging them together, different first units 14a can be combined with different second units 14b to form a mobile unit 14.

Figure 3:
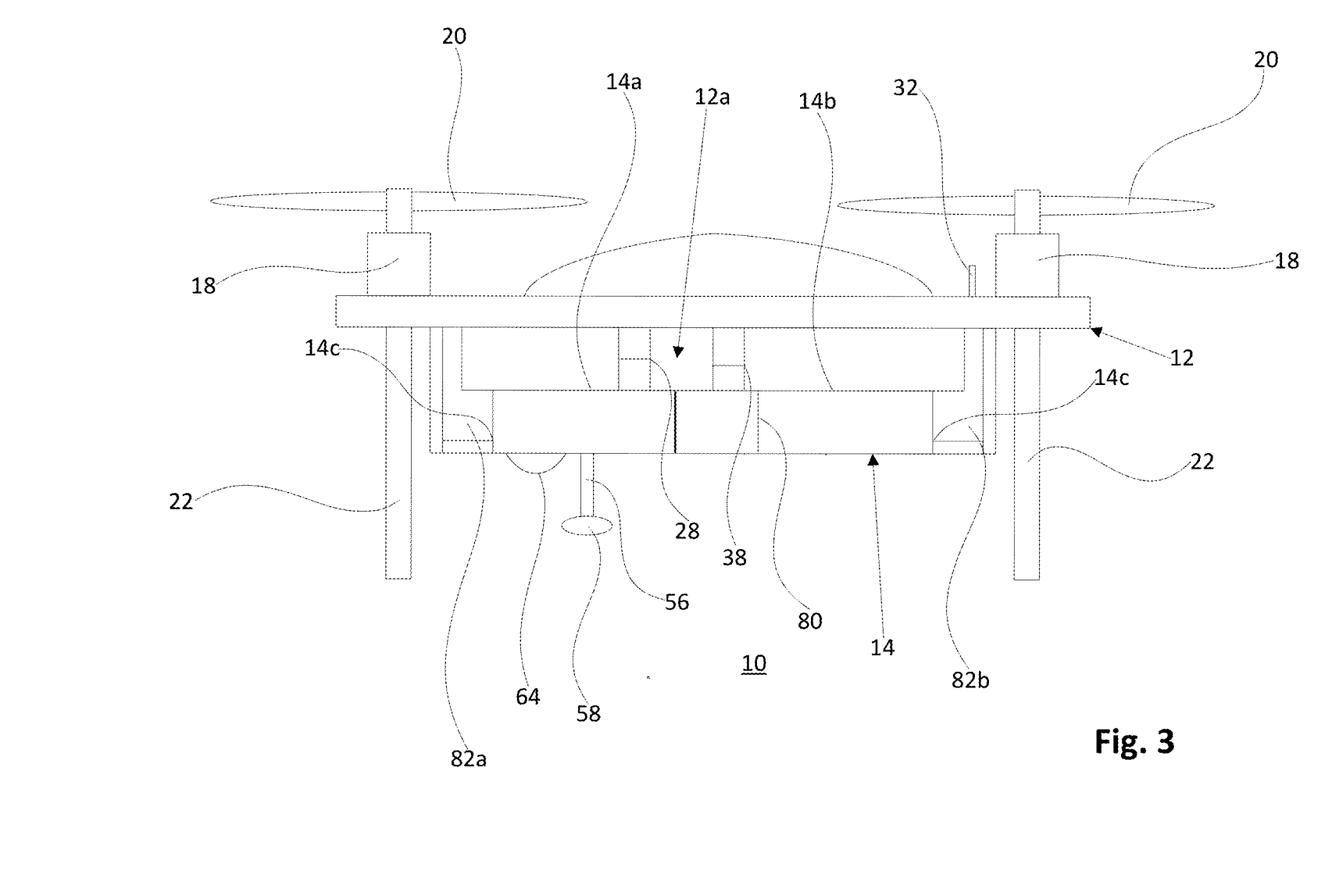
FIG. 3 is a lateral view of the carrier system according to the first embodiment of the invention, with the mobile device being connected to a aerial drone.

FIG. 3 is a lateral view of the aerial drone 12 in which only two of four electric motors 18 with associated propellers 20 are visible. Below each of the electric motors 18 the feet 22 are arranged. Two gripper arms 82a, 82b are provided between the feet 22, which are adapted to grasp and lift the mobile device 14, and to release and set it down again as required. The mobile device 14 comprises the two units 14a and 14b which are detachably connected to each other via the connector 80. In the first unit 14a, the camera 64 can be seen as part of the visual detection unit 62 as well as the tiller 58 at the distal end of the rotation unit 56.

The mobile device 14 can also be equipped with several different tool units 52 which are provided with a common arm 48 and, for example, a tool turret that will bring the required tool unit 52 into the activation position. However, it is also conceivable for the different tool units to each have their own actuator.

Figure 4:
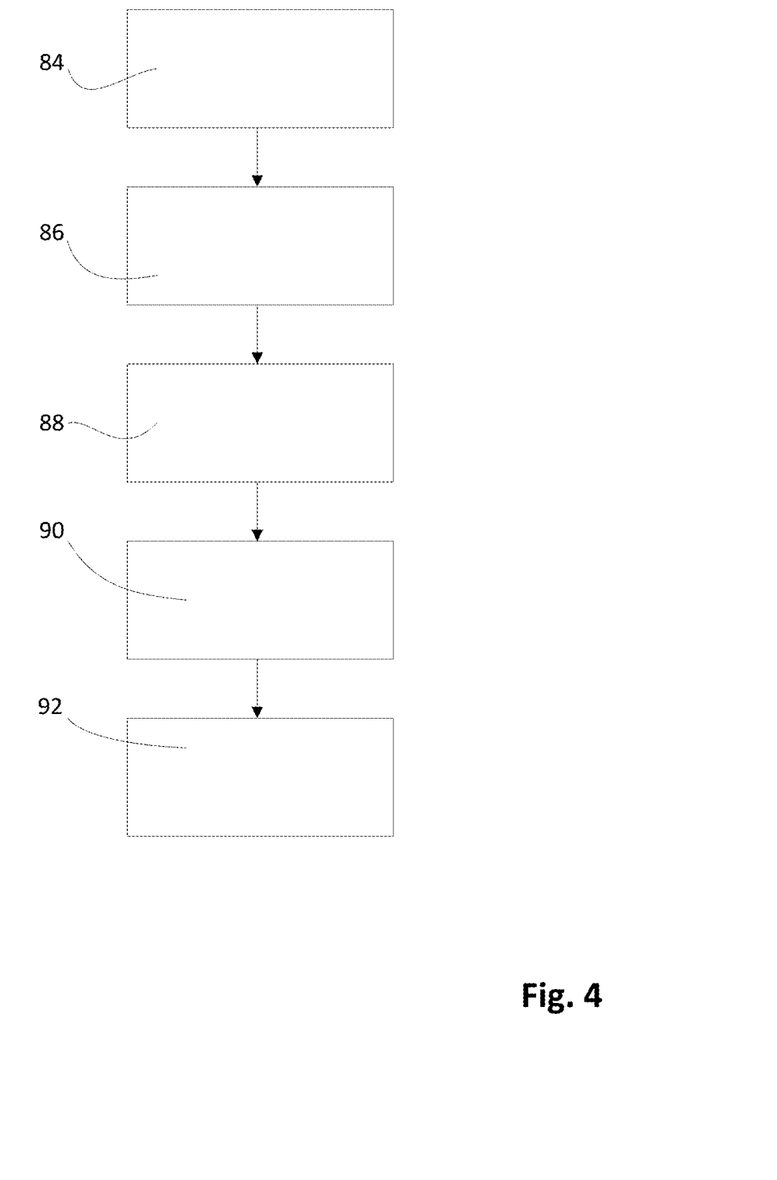
FIG. 4 is a flowchart illustrating the steps of a method using the carrier system.

The flowchart of FIG. 4 shows the steps that are performed in sequence in order to use the carrier system 10 for tilling the soil and for manipulating flora and fauna in agriculture.

In a first step 84, the carrier system 10 is first used to determine the measures required on the associated agricultural land. For this purpose, the carrier system 10 is for example brought to an agricultural area to be tilled, such as an agricultural field, or flown there directly from a central location. There the aerial drone 12 with the mobile device 14 then takes off and flies over the agricultural field. A stationary central computing unit supplies the carrier system 10 with the necessary data about the agricultural field to be surveyed. The central computing unit can also be a smartphone in this case. The visual detection unit 62 with the camera 64 of the mobile device 14 is used to capture images of the agricultural field. The images are evaluated and, after a comparison with data in the database 78, the necessary measures for this agricultural field are finally determined.

In a next step 86, based on the determined measures for the agricultural field or for partial areas of the agricultural field, the mobile unit 14 suitable for the necessary measure is then compiled from a set of first units 14a and a set of different second units 14b, which two units 14a, 14b are then connected to each other.

In a subsequent step 88, the gripper arm 82a and the gripper arm 82b, respectively, of the aerial drone 12 are used to grip the mobile unit 14 on the side and move it upwards towards the aerial drone 12 into a receptacle 12a of the aerial drone 12. In doing so, the voltage interfaces 26a, 26b are connected to each other via the connector 28 and the interfaces 36a, 36b are connected to each other via the connector 38. This supplies the mobile device 14 with voltage from the battery 24 of the aerial drone 12, and enables data exchange via the antenna 32 of the communication unit 30 of the aerial drone 12 with the communication units 60 and 74 of the mobile device 14 on the one hand and with a central processing unit on the other hand. As stated above, the central computing unit, which is independent of the carrier system 10, can also be a smartphone.

In a next step 90, the determined measures are performed using the carrier system 10 in the agricultural field. For example, the aerial drone 12 flies to the area of the agricultural field to be tilled. The arm 48 carrying the tool unit 52 moves to the weed to be removed. The feed unit 54 displaces the tiller 58 towards the weed in such a way that the weed will be milled away upon activation of the rotation unit 56.

In a fifth step 92, the aerial drone 12 then flies back, and exchanges the mobile device 14 for another mobile device 14 optimized for a different action, for example a pesticide or fertilizer applicator.

Alternatively, steps 86 and 88 may also be omitted if the aerial drone 12 is already ready for the action to be performed.

Figure 5:
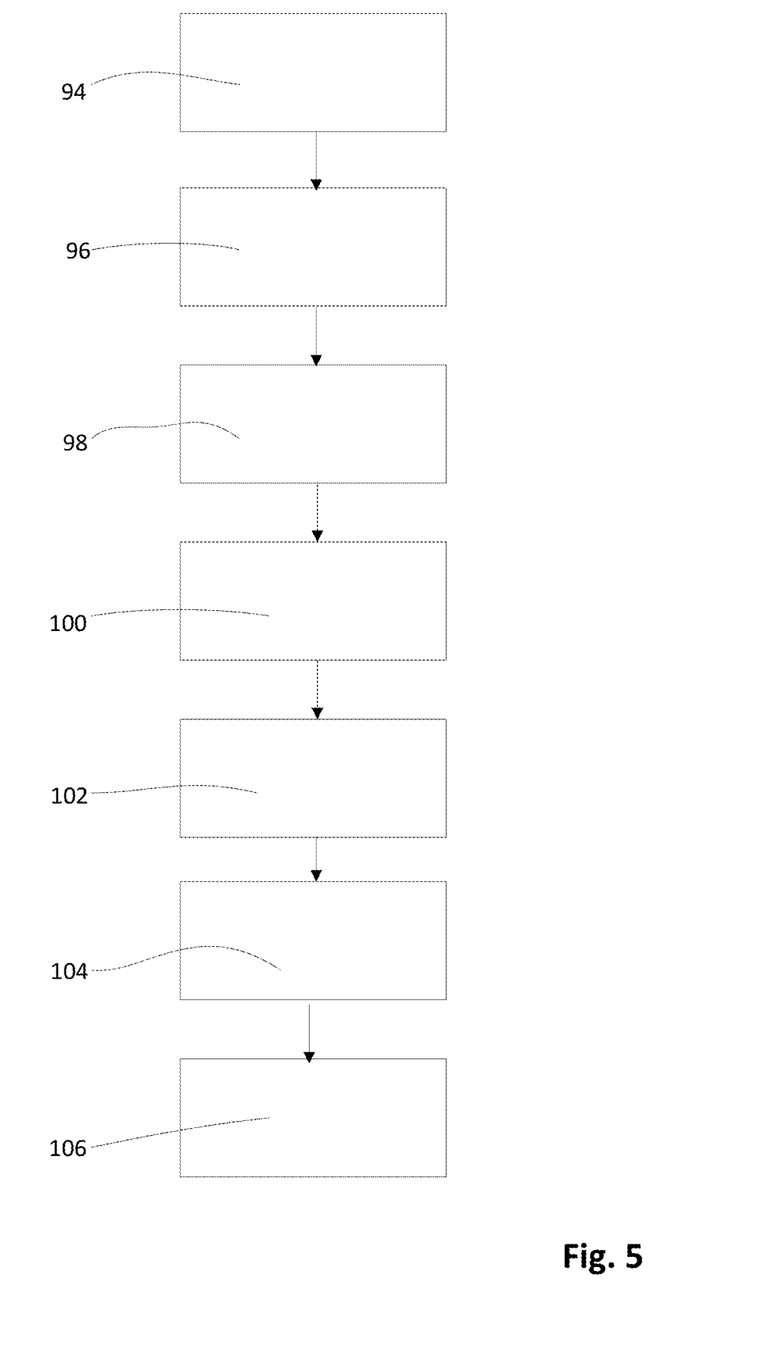
FIG. 5 is a flowchart illustrating the steps of a method used to determine the necessary measures.

With reference to FIG. 5, the determination of the necessary measures by the carrier system 10, in particular by the mobile device 14, will now be explained in detail.

In a first step 94, the continuous recording of data of technically defined voxels and/or pixels and/or images by the visual detection unit 62 of the mobile device 14 is performed. The voxels, pixels and images constitute recorded data which is continuously transmitted to the database 78—second step 96.

In a third step 98, the recorded data is stored.

In a fourth step 100, a qualitative data comparison of the recorded data with the data stored in the database 78 is performed. Here, a segmentation and data reduction of the recorded data is carried out by the segmentation and data reduction device 66. In particular, verification of the recorded data may also be performed by the second computer 76.

In a fifth step 102, evaluation is performed by the classifier 68 in conjunction with the second computer 76, supported by artificial intelligence, as will be detailed below.

Finally, in a sixth step 104, the processing and conversion of the evaluation by the first computer 46 into control data for the motor 50, the arm 48, the tool unit 52 and the aerial drone 12 is performed.

Finally, in a seventh step 106, the motor 50, the arm 48, and the tool unit 52 are started up for tilling the soil or for manipulating flora and fauna.

Where mention is made in this application of artificial intelligence, this relates to, among other things, the use of a classical convolutional neural network—CNN—of one or more convolutional layer(s) followed by a pooling layer. Basically, this sequence of convolutional and pooling layers can be repeated any number of times. Usually, the input is a two- or three-dimensional matrix, e.g. the pixels of a grayscale or color image. The neurons are arranged accordingly in the convolutional layer.

The activity of each neuron is calculated via a discrete convolution (convolutional layer). This involves intuitively moving a comparatively small convolution matrix (filter kernel) step by step over the input. The input of a neuron in the convolutional layer is calculated as the inner product of the filter kernel with the respective presently underlying image section. Accordingly, adjacent neurons in the convolutional layer will react to overlapping areas.

A neuron in this layer responds only to stimuli in a local environment of the previous layer. This follows the biological model of the receptive field. In addition, the weights for all neurons of a convolutional layer are identical (shared weights). This results in each neuron in the first convolutional layer encoding the intensity to which an edge is present in a certain local area of the input, for example. Edge detection as the first step of image recognition has high biological plausibility. It immediately follows from the shared weights that translation invariance is an inherent property of CNNs.

The input of each neuron, determined by discrete convolution, is now transformed by an activation function, for CNNs usually Rectified Linear Unit, or ReLu ($f(x)=\max(0, x)$), into the output that is supposed to model the relative firing frequency of a real neuron. Since backpropagation requires the computation of gradients, a differentiable approximation of ReLu is used in practice: $f(x)=\ln(1+e^x)$. As with the visual cortex, in deeper convolutional layers there is an increase both in the size of the receptive fields and in the complexity of the recognized features.

In the subsequent step, pooling, superfluous information is discarded. For object recognition in images, for example, the exact position of an edge in the image is of negligible interest—the approximate localization of a feature being sufficient. There are different types of pooling. By far the most common type is max-pooling in which of each 2×2 square of neurons in the convolutional layer, only the activity of the most active (hence "max") neuron is retained for further computational steps; the activity of the remaining neurons is discarded. Despite the data reduction (75% in the example), the performance of the network is usually not reduced by pooling.

The use of the convolutional neural network and the segmentation and data reduction device 66 is explained in more detail below with reference to FIGS. 6 through 14.

There are various approaches for the classification of all objects in an image by the classifier 68. Many approaches start by first finding the individual objects in the image and then classifying them. However, this is not always possible. Let us look at the classification of plants 108 in a field as an example. An example image 108 is shown in FIG. 6.

Figure 6:
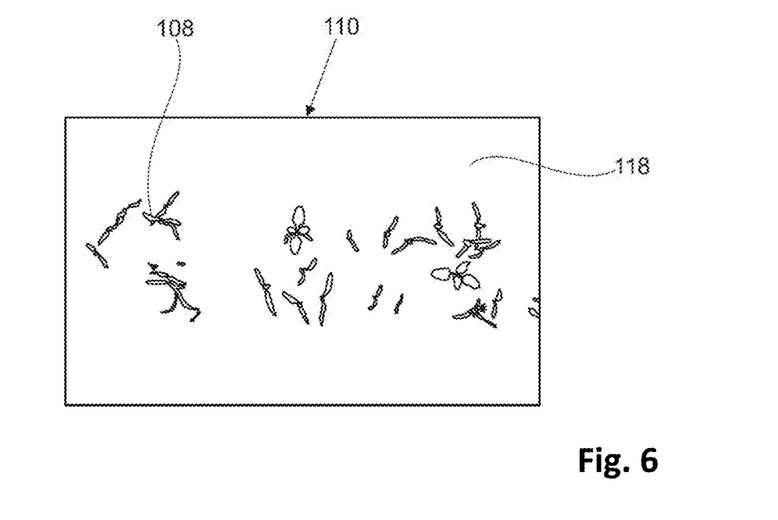
FIG. 6 is an image captured by the visual detection unit.

FIG. 6 shows various plants 108 that are all to be classified by the classifier 68, which classification is to be performed in real time. Real time in this case refers to the camera rate of 10 frames per second. Since, as in this example, it is not easy to distinguish where exactly a plant 110 ends, a different approach must be used, since the computation time is not sufficient to first distinguish the plants 110 and then to classify them.

The image 108 shown in FIG. 6 is made up of pixels, and each pixel can logically contain precisely one class only. Therefore, a trivial approach would be to classify the entire image 108 pixel by pixel. This means that pixel after pixel is each assigned to a class.

However, since a single pixel does not contain sufficient information to determine which class it belongs to, a surrounding area must be used for the classification. This area can then be classified using a convolutional neural network (CNN) as described above. The network can be of a sequence as illustrated in FIG. 7.

Figure 7:
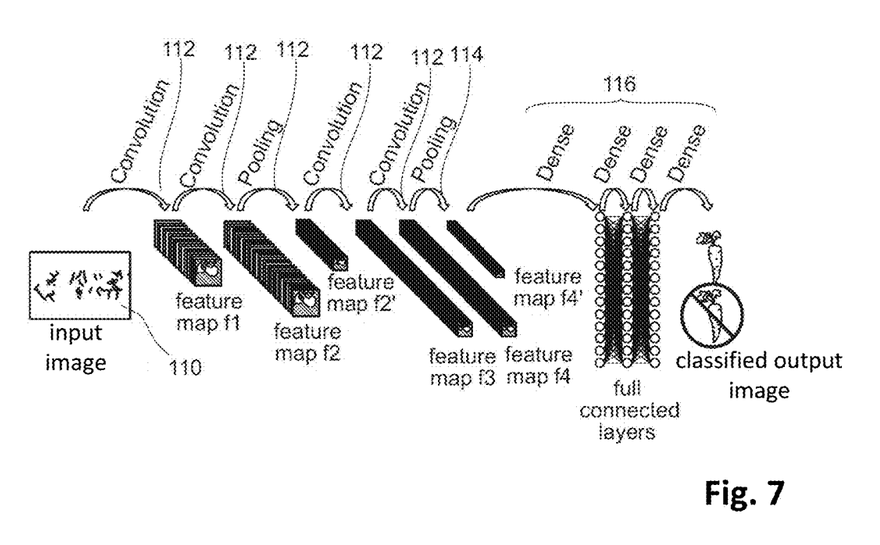
FIG. 7 is a schematic diagram of a convolutional neural network on the basis of the image of FIG. 6.

The input image 110 of FIG. 7 is the image of FIG. 6. The elements of the CNN are now applied to this input image 110. In this example, these elements are a convolution 112 with the features, subsequent pooling 114, another convolution with additional features, another pooling and a consolidation in the dense layer 116. The output of the network then indicates which class the center pixel of the input image 110, respectively a pixel of the image 110 of FIG. 6, belongs to.

Subsequently, a new image section, usually an image section that is shifted by one pixel, is selected and classified again using CNN. As a result of this procedure, the calculations required by the convolutional neural network must be repeated for the number of pixels to be classified. This is time consuming. Image 110 of FIG. 6 has a resolution of 2,000×1,000 pixels. Thus, the CNN would have to be computed two million times. However, the initial problem is only the classification of the plants 108 per se. On average, such an image contains about 5% plant pixels, corresponding to only approx. 100,000 pixels.

Figure 8:
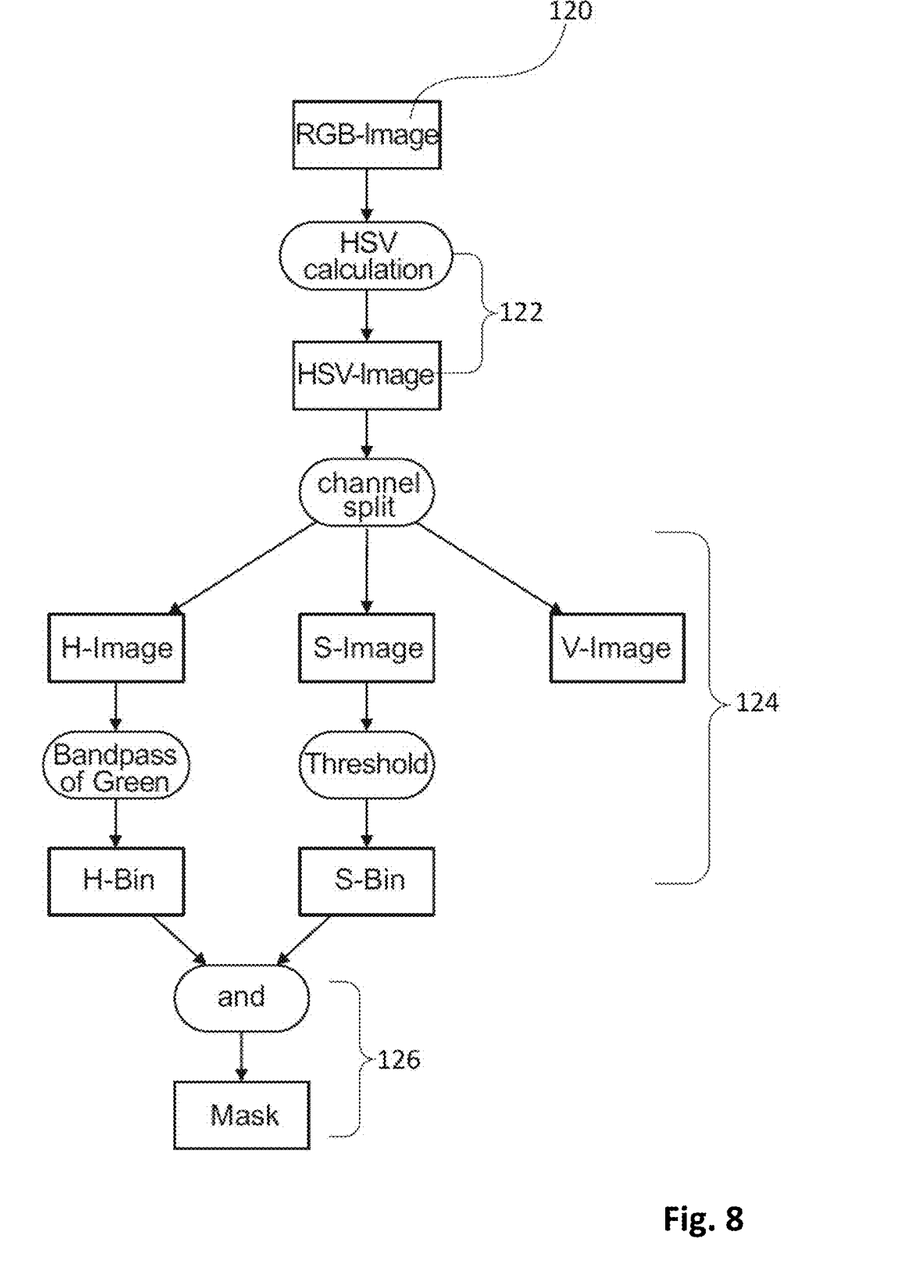
FIG. 8 is a flowchart depicting a method used by the segmentation and data reduction unit.

By means of simple segmentation and data reduction by the segmentation and data reduction unit 66, it can be determined whether a pixel is a representation of a part of a plant 108 or of a background 118. In terms of computation, this segmentation is not as complex as a CNN and therefore faster. The segmentation and data reduction by the segmentation and data reduction unit 66 is performed in the same way as in FIG. 8. The individual steps of this process are shown in FIG. 8.

In a first step 120, each image of multiple pixels transmitted to the database 78 is converted to the RGB (red, green, and blue) color model.

In a next step 122, each pixel of the transmitted image is converted to an HSV (hue, saturation, value) color model based on the RGB color model.

In a next step 124, this HSV color model is evaluated.

Each pixel based on the HSV color model is evaluated with respect to color saturation according to a threshold value, wherein, if the color saturation value exceeds a threshold value, the pixel is assigned the binary value 1, and if the color saturation value falls below a threshold value, the pixel is assigned the binary value 0.

Parallel thereto, based on the HSV color model, each pixel is evaluated with respect to the hue angle based on a predetermined range, wherein, if the hue angle is within the predetermined range, the pixel is assigned the binary value 1, and if the hue angle is outside the range, the pixel is assigned the binary value 0.

In a next step 126, the binary hue angle and color saturation information is used to generate an intermediate image that contains significantly less data than the image 108 generated by the camera.

The segmentation illustrated in FIG. 8 results in the formula given below, which must be applied to each pixel. The layout of the RGB image $\psi(x,y)$ is used to divide the segmented image $S(x,y)$ into its three components red, green and blue. A pixel of the segmented image is then set to 1 if the minimum value of red, green or blue of a pixel divided by the green pixel is less than or equal to a threshold value (THs). Which threshold value in the 8 bit space of the image is determined by scaling using 255. If the threshold value is not reached, the pixel of the segmented image is set to 0, as in equation 1.

$$S(xy) = \begin{cases} 1 & \text{if } \frac{\text{MIN}(\psi_{Red}(x, y), \psi_{Green}(x, y), \psi_{Blue}(x, y))}{\psi_{Green}(x, y)} \leq \frac{255 - THs}{255} \\ 0 & \text{otherwise} \end{cases} \quad (1)$$

Figure 9:
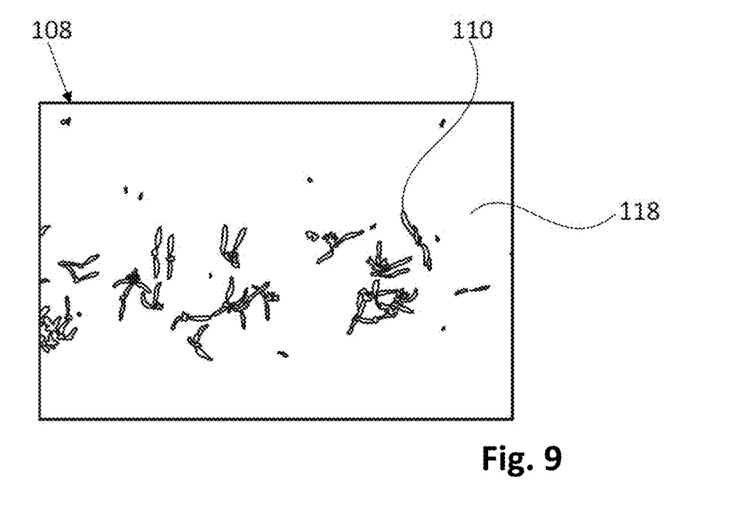
FIG. 9 is an intermediate image created by the segmentation and data reduction unit.

This results in the first optimization: before the entire image 108 is decomposed into two million images, the segmentation according to FIG. 8 is used. That is, the entire image 108 is analyzed pixel by pixel and a decision is made, using the above formula, as to whether or not it is a plant pixel. Firstly, the image 108 is segmented, that is, the background 118 is set to black (0), as shown in FIG. 9. Secondly, if it is a plant pixel, its coordinates are written into a list. Then, only those coordinates that are also in this list are input into the CNN. The unnecessary pixels of the soil, i.e. the background 118, are omitted. Thus, the CNN is called about 20 times fewer.

Figure 10:
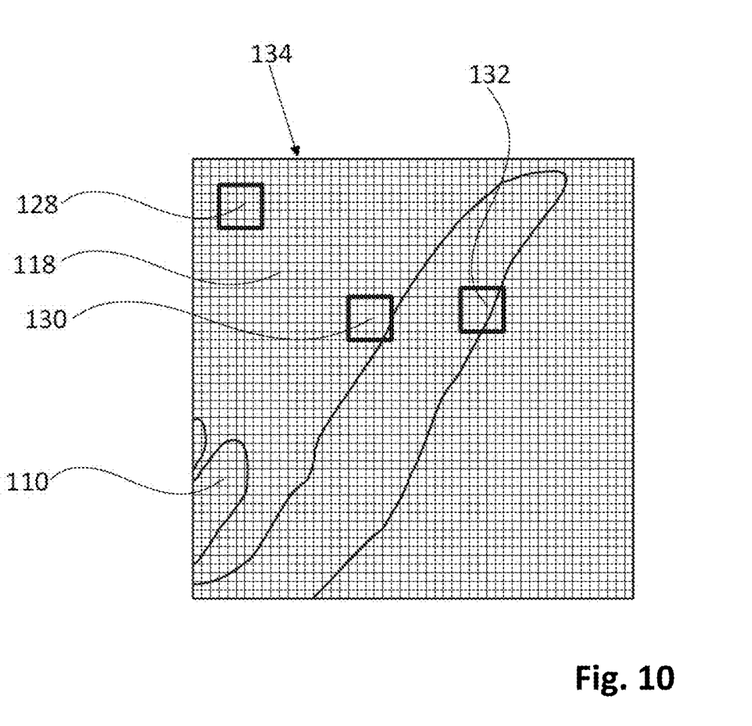
FIG. 10 is a view of part of the intermediate image with three different cases for the classifier.

As a result of the segmentation, the background 118 is set to the value 0. The image elements that the CNN looks at now also have segmented images. Normally, in a convolution layer, the feature calculation would be applied to each pixel of the image element. However, this results in three cases 128, 130, 132 for the calculation, which are shown in FIG. 10, each for a feature 134 of a size of 5×5 pixels.

The Red case 128 shows a feature calculation in which the feature is completely on the background 118. Here, each element is multiplied by 0, which results in the entire calculation being 0, or the bias value. The result of this calculation is therefore already known before the calculation. Even if the background 118 were non-zero, i.e. contained soil, this calculation would not include any information about the plant 110, so the result may simply be a constant fictitious value.

In the Yellow case 130, the mean feature value is not on a plant 110. This means that part of it is also a multiplication by zero. In this case, the plant 110 is distorted in the margin and thus made larger in the feature map.

In the Blue case 132, at least the center pixel of the feature is on a plant.

After considering these three cases 128, 130, 132, only the Yellow and Blue cases 130 and 132 need to be calculated, i.e. the cases 130, 132 in which the feature has at least one non-zero input value. The results of all the other feature computations are known before the computation, they are zero and/or only the bias value. The coordinates in which the Blue case 132 occurs are known. These are the coordinates stored during the segmentation. For the Yellow case 130, a computation must again be made whether this case has occurred. This requires a check of each plant pixel found in the segmentation. Since such a check is too much effort and the Yellow Case 130 only occurs in the border area of a plant 110, this case shall be ignored.

Therefore, the calculation can be optimized in that the feature calculation and all other elements of the CNN are only applied to the plant pixels found.

Figure 11:
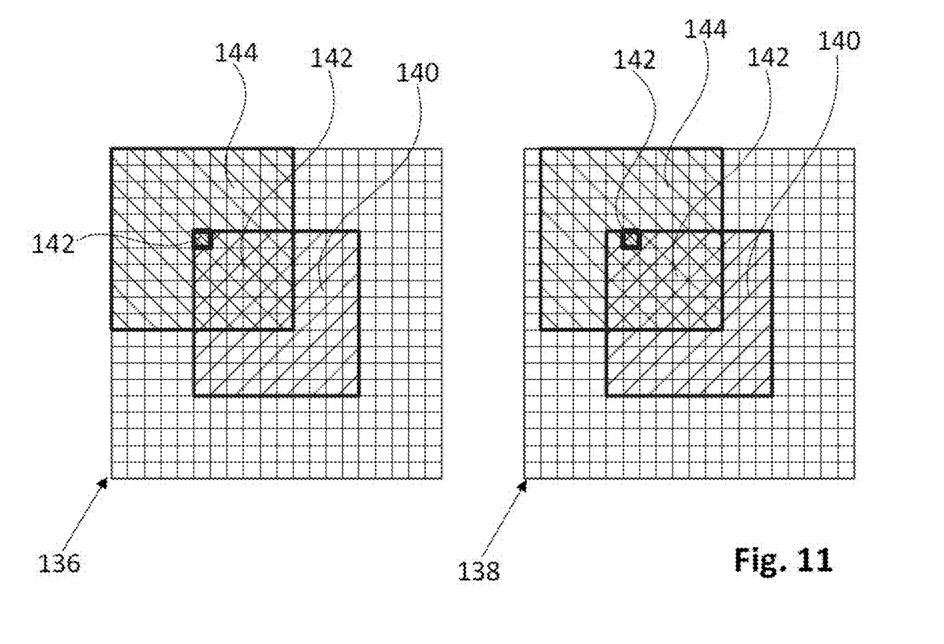
FIG. 11 is a view of two principle representations of further pixel fields for evaluation by the classifier.

FIG. 11 is a schematic view illustrating how two neighboring plant pixels 136, 138 differ from each other. On the left is a plant pixel 136 and on the right is an adjacent plant pixel 138. The Blue/Purple area 140, 142 could be different plants that need to be classified. The Red/Purple area 144, 142 represents the image element that the CNN is looking at in order to classify the orange pixel 146.

Closer inspection shows that there is a significant overlap in the region under consideration (Red/Purple) 144, 142. This in turn means that both image elements 136, 138 contain mostly the same values. If the CNN now calculates the feature in the convolution layer, the same values would also be obtained in the feature calculation.

Figure 12:
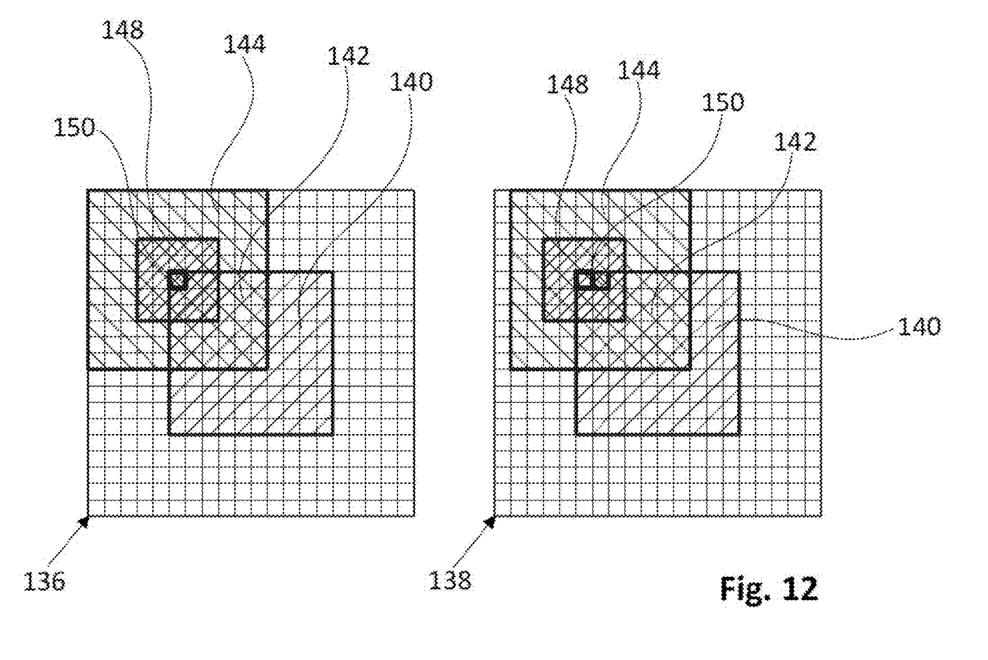
FIG. 12 is a view of two principal representations of further pixel fields for evaluation by the classifier.
Figure 13:
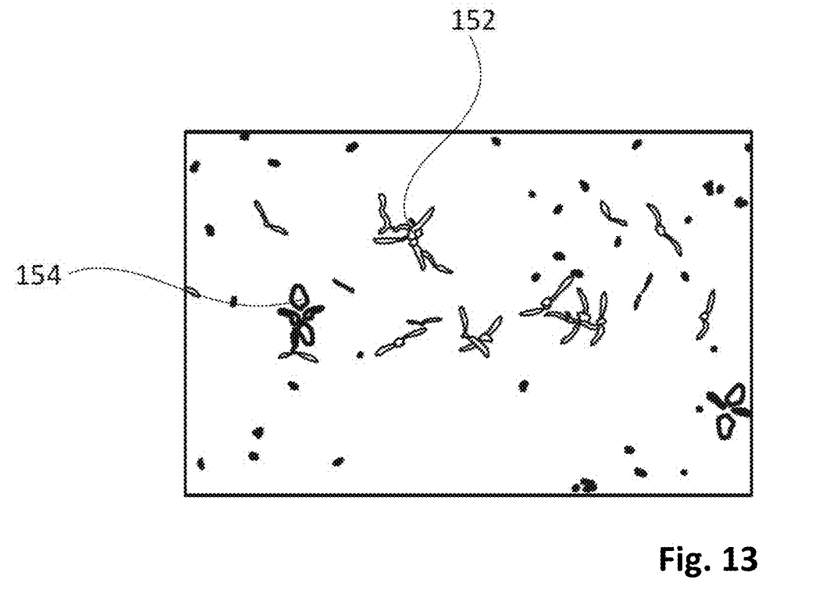
FIG. 13 is an image created and evaluated by the classifier.

In FIG. 12, a feature 148 of a size of 5×5 pixels is schematically sketched in green. This feature 148 is located at the same coordinates within the entire image, but it is displaced within the image element (red/purple) 144, 142 to be viewed by the CNN. However, since its location is the same throughout the image, the calculation for the center black box 150 would yield the same value in both the left image 136 and the right image 138. This finding can be applied to all elements of a CNN. As a result, provided the edge region is ignored, the single feature calculation can be applied to the entire image first. Theoretically, the decomposition of the input image 108 only plays a decisive role at the dense layer 116 level. The dense layer 116 can, however, be computed in the same way as a convolution 112. In this case, the feature size results from the interaction of input image size and the existing pooling layers in the network. This allows the classification to be further optimized; CNN elements are now applied only to the plant pixels found. The feature map calculated from the last convolution represents the classification result as shown in FIG. 13. Here, pixel by pixel, all carrot plants 152 are classified in green and all weeds 154 are classified in red.

However, these optimizations also cause changes in the classification result. The pooling layers have the greatest influence here. With each pooling, information is removed from the network. However, because the image elements are no longer considered individually, local reference is lost for the pooling. This problem is illustrated in FIG. 14.

Figure 14:
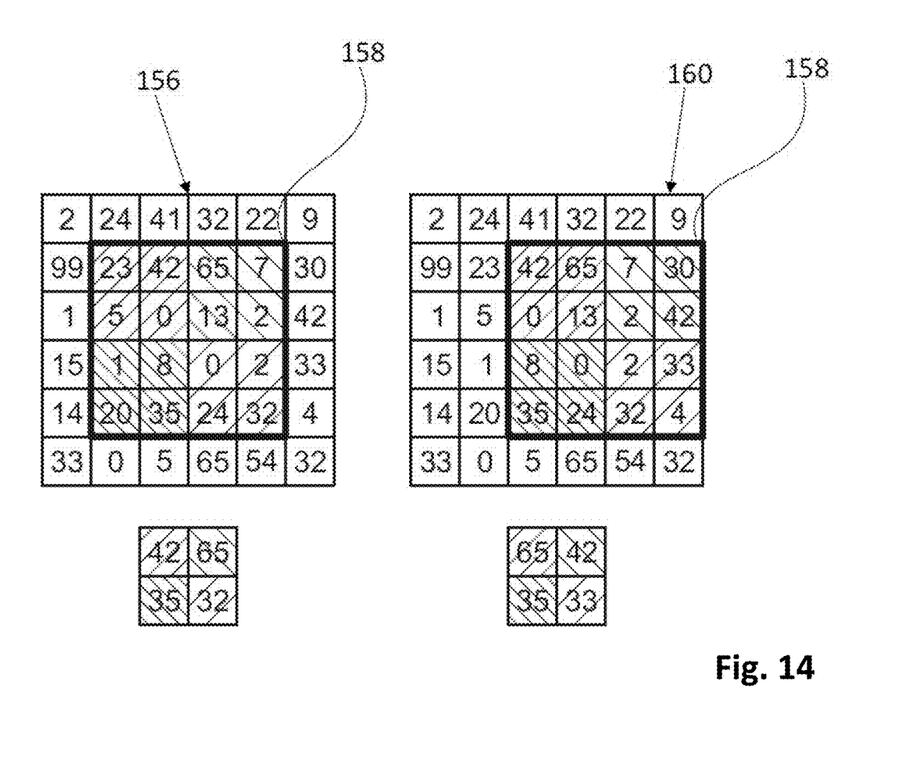
FIG. 14 is a view of schematic representations of the operation of the classifier.

In FIG. 14, a picture element 156 is shown as a red frame 158. Prior to optimization, each pixel would be run individually through the CNN in order to classify its center pixel. The right image element 160 is shifted one pixel further to the right. The four colors: purple, blue, yellow and green indicate the individual applications of pooling. As can be seen, they can give different results, because pooling always starts at the edge and moves one pooling element further (two fields in this case). This results in two different pooling elements from two adjacent image elements 156, 160. As a result, if this is to be considered in the optimization, each pooling would result in two new branches for the further calculation. Since the pooling would have to be applied once to the entire image, it [would have to have] its starting point at the top left, and another pooling [would have to have] its starting point at the top left plus one pixel. In the further calculation both pooling results would then have to be processed separately. Another second pooling would result in two new paths again, so that four separate results would have to be calculated. The result is then composed of the four results rotating pixel by pixel. If only one path is considered after pooling, the output image would be smaller after pooling twice. The length and width of the output image would then each be only ¼ as large as the input image. Considering all paths would result in approximately the input image size.

Another difference is represented by the missing edge regions of the plants. Since the features are not applied to all elements in which there is any overlap with the plant, computational differences exist here. This may also change the classification result compared to the conventional calculation.

The missing calculation of the feature values outside the plant can result in other values in that the result is given as zero, which in reality is the bias value, however.

While these three factors do affect the results, this still shows that the CNN is very robust and thus the results still meet a very high accuracy value.

The next step would be to train the network directly with these modifications, so that the network can adapt even better to its new calculation and thus compensate for any errors directly in the calculation.

The segmentation and data reduction device provides the pixels relating to the weed 154 with position coordinates.

LIST OF REFERENCE SIGNS 10 carrier system
12 aerial drone
12a receptacle, receiving space of the aerial drone 12
12b aerial drone control device
14 mobile device
14a first unit
14b second unit
14c gripper arm receptacle on mobile device 14
16 drive
18 electric motor
20 propeller
22 feet
24 battery
26a voltage interface on aerial drone 12
26b voltage interface on mobile device 14
28 plug connection
30 communication unit
32 antenna
34 GPS unit
36a interface on aerial drone 12
36b interface on mobile device 14
38 plug connection
40 first housing of first unit 14a
42 second housing of second unit 14b
44 plug connection
46 first computer
48 arm serving as actuator
50 motor
54 feed unit
56 rotation unit
58 miller
60 first communication unit of first unit 14a
62 visual detection unit 64 camera
66 segmentation and data reduction unit
68 classifier
70a interface of first unit 14a
70b interface of second unit 14b
72 communication link
74 second communication unit of second unit 14b
76 second computer
78 database
80 plug connection
82a left gripper arm
82b right gripper arm
84 first step: determine necessary measures
86 second step: select mobile device 14 from available mobile devices 14
88 third step: connect device to aerial drone 12
90 fourth step: carry out determined measures
92 fifth step: exchange mobile device 14 for another mobile device 14 and carry out another measure
94 first step: continuous recording
96 second step: transmitting the data
98 third step: storing the data
100 fourth step: data comparison
102 fifth step: evaluation by the classifier 68
104 sixth step: conversion into control data
106 seventh step: starting up the components
108 example image, input image
110 plant
116 feeding into in a dense layer
118 background
120 first step: convert into a RGB color model
122 second step: convert into an HSV color model
124 third step: evaluate HSV image
126 fourth step: create an intermediate image
128 first case, red
130 second case, yellow
132 third case, blue
134 feature
136 left plant pixel
138 right plant pixel
140 blue area
142 purple area
144 red area
146 orange area
148 feature, green
150 center black box
152 carrot plant
154 weeds
156 left image element
158 red frame
160 right picture element

The invention claimed is:

1. Method for real-time control of the tilling of the soil and/or of the manipulation of flora and fauna using a mobile analysis and processing device (14) for agriculture comprising: at least one sensor (62), a tool unit (52) with at least one motor-driven tool (58), an actuator (48) for moving said at least one motor-driven tool (58) of said tool unit (52), said at least one sensor (62) detects data pertaining to said agriculture, a motor (50) for driving said tool unit (52) and/or said actuator (48), a database (78), said database populated with stored data, a first communication unit (60) with an interface (70a) for communicating with said database, and a first computer (46) for controlling said at least one sensor (62), said tool unit (52) and/or said actuator (48) on the basis of generated control commands, and, wherein said data detected by said sensor (62) is continuously compared, by said first computer (46) based on classification by a classifier and data reduction by a reduction device (66), with said stored data in said database (78) to generate control commands for said actuator (48), said tool unit (52) and/or said motor (50), comprising the following steps:
 a. continuous recording over time of data-defined voxels and/or pixels and/or images by said sensor;
 b. transmission of said recorded data to said database (78);
 c. storage of said recorded data in said database (78);
 d. qualitative data comparison of said recorded data with said data stored in said database (78), and at said same time performing segmentation, data reduction, and/or verification of said recorded data with said computer (46);
 e. evaluation of said compared recorded data with existing defined data sets in said database (78) by a classifier (68) in connection with said computer (46, 76);
 f. processing and conversion of said evaluation by said computer (46, 76) into control data and control-related data for said motor, said actuator, said tool unit and/or an associated carrier.

2. The method for real-time control of the tilling of the soil and/or of the manipulation of flora and fauna according to claim 1, characterized in that, after the control data and/or control-related data is available, said motor (50), said actuator (48), said tool unit (52) and/or said carrier (12) for tilling said soil and/or an associated carrier (12) for manipulating flora and fauna are started up.

3. The method for real-time control of the tilling of the soil and/or of the manipulation of flora and fauna according to claim 1, characterized in that said evaluation is performed in a computer (46, 76) cooperating with a classifier (68) in said second computer (76), and the processing and conversion of said evaluation into control data and/or control-related data is performed in another computer (46, 76), in said first computer (46), for which purpose the evaluation is transmitted from the one computer (46, 76) to said another computer (46, 76).

4. The method for real-time control of the tilling of the soil and/or of the manipulation of flora and fauna according to claim 1, characterized in that the storage, the qualitative comparison of said recorded data with said data stored in said database (78) and/or said evaluation by the classifier (68) are supported by artificial intelligence.

5. Method for real-time control of the tilling of the soil and/or of the manipulation of flora and fauna as claimed in claim 1 further comprising the step of: moving said device (14) using means (82a, 82b) provided for connecting said device to said carrier (12) and/or switching said device from said carrier to another carrier.

6. Mobile analysis and processing device (14) for agriculture for tilling the soil and/or for manipulating flora and fauna, comprising:
 at least one sensor (62), a tool unit (52) with at least one motor-driven tool (58), an actuator (48) for moving said at least one motor-driven tool (58) of said tool unit (52),
 said at least one sensor (62) detects data pertaining to said agriculture,
 a motor (50) for driving said tool unit (52) and/or said actuator (48),
 a database (78), said database populated with stored data,
 a first communication unit (60) with an interface (70a) for communicating with said database,
 and a first computer (46) for controlling said at least one sensor (62), said tool unit (52) and/or said actuator (48) using generated control commands, wherein said data detected by said sensor (62) is continuously compared, by said first computer (46) based on classification by a classifier and data reduction by a reduction device (66), with said stored data in said database (78) to generate control commands for said actuator (48), said tool unit (52) and/or said motor (50), a two-part device in which said sensor (62), said tool unit (52), said motor (50) for driving said tool (58), said tool unit (52) and/or said actuator (48), said first computer (46) and said first communication unit (60) with interface (70a) are provided in a first unit (14a), and said database (78), a second computer (76) and a second communication unit (74) with interface (70b) are provided in a second unit (14b), wherein said first unit (14a) and said second unit (14b) can be connected to one another via said interfaces (70a, 70b) for data exchange.

7. The mobile analysis and processing device according to claim 6, characterized in that comparison of said data determined by said sensor (62) with said data in said database (78) is performed in real time, with verification and classification of said data determined by said sensor (62).

8. The mobile analysis and processing device according to claim 6, characterized in that said sensor is a visual detection unit (62) with a camera (64).

9. The mobile analysis and processing device according to claim 6, characterized in that means (82a, 82b) are provided for connecting said device to a carrier (12) for moving said device (14).

10. The mobile analysis and processing apparatus according to claim 9, characterized by a communication interface (36b) for a carrier (12).

11. The mobile analysis and processing device according to claim 10, characterized in that said communication interface (36b) is arranged in a second unit (14b).

12. The mobile analysis and processing device according to claim 6, characterized in that said first unit (14a) comprises a first housing (40) and said second unit (14b) comprises a second housing (42).

13. The mobile analysis and processing device according to claim 12, characterized in that said first and second housings (40, 42) are detachably connected to each other via a plug-in connection (44, 80).

14. The mobile analysis and processing device according to claim 12, characterized in that said first and second housings (40, 42) have receptacles (14c) as means for connection to a carrier (12) as required, said receptacles are associated with corresponding holding means (82a, 82b) of said carrier (12), by means of which said device (14) can be gripped and moved by said carrier (12).

15. The mobile analysis and processing device according to claim 12, characterized in that said first and second housings (40, 42) comprise, as means for connection to said carrier (12) as required, coupling means (26b, 28, 36b, 38) associated with corresponding coupling means (26a, 28, 36a, 38) of said carrier (12), by means of which said device (14) can be connected to and moved by said carrier (12).

16. The mobile analysis and processing device according to claim 12, characterized in that said tool unit (52) comprises at least one feed unit (54) and a rotation unit (56) cooperating with said motor (50).

17. The mobile analysis and processing device according to claim 16, characterized in that at a distal end thereof, said rotation unit (56) comprises at least said tool (58), said tool is selected from the group consisting of a miller (58) and a blade unit.

18. The mobile analysis and processing device according to claim 6, characterized by a voltage connection (26b) for an external voltage supply.

19. The mobile analysis and processing device according to claim 18, characterized in that said voltage connection (26b) is provided on a first unit (14a) and is used for voltage supply both to said first unit (14a) and a second unit (14b).

20. The mobile analysis and processing device according to claim 6, characterized in that means (82a, 82b) are provided for connecting said device to a carrier (12) for moving said device (14).

21. Mobile analysis and processing device (14) for agriculture for tilling the soil and/or for manipulating flora and fauna, comprising:
    at least one sensor (62), a tool unit (52) with at least one motor-driven tool (58), an actuator (48) for moving said at least one motor-driven tool (58) of said tool unit (52),
    said at least one sensor (62) detects data pertaining to said agriculture,
    a motor (50) for driving said tool unit (52) and/or said actuator (48),
    a database (78), said database populated with stored data,
    a first communication unit (60) with an interface (70a) for communicating with said database,
    and a first computer (46) for controlling said at least one sensor (62), said tool unit (52) and/or said actuator (48) using generated control commands,
    wherein said data detected by said sensor (62) is continuously compared, by said first computer (46) based on classification by a classifier and data reduction by a reduction device (66), with said stored data in said database (78) to generate control commands for said actuator (48), said tool unit (52) and/or said motor (50),
    a plurality of two-part devices (14) each having a first unit (14a) and a second unit (14b), each of said first (14a) and second (14b) units populated with components so as to be configured to perform certain tasks,
    a carrier, and
    said two-part devices (14) are switchable between a stored position and residing in said carrier to perform certain tasks.

* * * * *